United States Patent Office 2,927,895
Patented Mar. 8, 1960

2,927,895

NOVEL COMPOSITION OF IMPROVED LUBRICATING PROPERTIES COMPRISING A FLUOROCHLORO POLYMER

Dickson E. Neunherz, Columbus, Ohio, assignor, by mesne assignments, to Minnesota Mining and Manufacturing Company, St. Paul, Minn., a corporation of Delaware No Drawing. Application September 20, 1955
Serial No. 535,507

4 Claims. (Cl. 252—58)

This invention relates to a novel composition of matter having improved lubricating properties, and to a method for the preparation thereof. In one aspect this invention relates to a novel normally liquid lubricating composition having improved properties. In another aspect this invention relates to a novel grease composition having improved lubricating properties.

A variety of oils and greases which are useful as lubricants are commercially available today. These compositions are satisfactory in many applications, but where some degree of chemical stability, for example, is required they usually prove inadequate. Presently available lubricating compositions are also relatively useless as high pressure lubricants and at elevated temperatures due to their lack of sufficient load-carrying capacity and due to their inflammable nature. In addition to these properties many of the presently available materials having oil and grease characteristics possess other undesirable properties which limit their application as lubricants. For example, many corrosively attack natural and synthetic rubbers, tend to solidify at low temperatures, have poor film strength, low electrical resistivity, and are unsuitable for use as lubricants in refrigeration systems. In addition many of the presently available grease compositions gradually break down under conditions where high shearing stresses are involved.

It is an object of the present invention to provide a novel composition having improved lubricating properties.

Another object is to provide a novel lubricating composition having improved lubricity properties such as load-carrying capacity and improved chemical stability.

Another object is to provide a novel composition having improved lubricity properties and which is suitable for use in an environment subject to exposure to strong chemicals, refrigerants and to relatively extreme conditions of temperature.

A further object is to provide a normally liquid lubricating composition which is chemically and physically superior to currently available compositions and to provide a process for the preparation of such a composition.

A further object is to provide a novel grease composition having lubricating properties and which is chemically and physically superior to currently available compositions and to provide a process for the preparation of such a composion.

Further objects and advantages of the present invention will become apparent to those skilled in the art from the accompanying description and disclosure.

Accordingly, these objects are accomplished by the process which comprises admixing a low molecular weight polymer of a perfluorochloroolefin with a lubricating oil of natural origin. Of the low molecular weight polymers of a perfluorochloroolefin which are employed as one component of the compositions of the present invention, the telomer products of a perflurochloroethylene having halogen-containing terminal groups are used to best advantage. The lubricating oils of natural origin employed as a second component of the novel composition of the present invention are preferably the standard hydrocarbon mineral lubricating oils or distillates derived from petroleum and its products. The novel compositions of the present invention have particularly good lubricity properties such as a high load-carrying capacity as evidenced by their high Point B values, and are particularly useful as extreme pressure lubricants, and in an environment subject to exposure to strong and corrosive chemicals and fuels, refrigerants, and to relatively extreme conditions of temperature, that is, at temperatures between about $-40°$ C. and $+175°$ C.

The low molecular weight polymer of a perfluorochloroethylene which is preferably employed as one component in the composition of this invention is prepared by telomerization of perfluorochloroethylenes such as trifluorochloroethylene and difluorodichloroethylene to produce oils, greases and waxes. Also useful are cotelomers of the above perfluorochloroethylenes prepared by cotelomerization with each other and with hydrogen-containing halogenated olefins such as vinyl fluoride, vinylidene fluoride, vinyl chloride and vinylidene chloride. The particularly preferred telomers are those which are prepared by the homotelomerization of trifluorochloroethylene in the presence of a sulfuryl halide, such telomers having an even number of carbon atoms and a halogen terminal group.

As used herein the term "telomer" includes homotelomers and cotelomers, and the term "telomerization" includes homotelomerization ond cotelomerization, and by the term "low molecular weight polymer" is meant a polymer having a molecular weight not higher than 10,000.

The preparation of the above-mentioned particularly preferred class of low molecular weight polymers of perfluorochloroethylenes which is used as one component of the compositions described herein is accomplished by telomerizing the perfluorochloroethylene in the presence of a sulfuryl halide, and a catalyst such as benzoyl peroxide which is usually dissolved in an inert solvent, at a temperature between about $75°$ C. and about $210°$ C. The telomerization may be effected in the presence or absence of sulfur dioxied as desired. The homotelomers of trifluorochloroethylene thereby produced have the general formula $Y_1—(CF_2—CFCl)_n—Y_2$ where $Y_1$ and $Y_2$ are members selected from the group consisting of fluorine, chlorine, and bromine and may be the same or different, and $n$ is an integer of at least one, preferably of at least 4, and is not more than 20. The telomers may be separated by conventional distillation. The distillable substances obtained by telomerization of trifluorochloroethylene in the presence of sulfuryl chloride, for example, are sufficiently stable so as not to absorb appreciable amounts of fluorine even though exposed to the gas for 24 hours at a temperature of $60°$ C. or so as not to significantly pyrolytically decompose at temperatures up to $200°$ C.

For purposes of clarity a specific example of the telomerization of the preferred monomer, trifluorochloroethylene, is presented below.

EXAMPLE 1

A pressure system was flushed out with nitrogen and charged with a peroxide solution (3.5 parts of benzoyl peroxide dissolved in 38 parts of carbon tetrachloride) and 135 parts of sulfuryl chloride. This system was cooled to about $-25°$ C. or below and 116 parts of trifluorochloroethylene was added. The system was closed and heated to about $95°$ C. for a period of 4 hours during which time the mixture was mechanically agitated.

A maximum gage pressure of 300 pounds per square inch was reached and then gradually subsided. At the end of the telomerization, the gases were bled from the system and the liquid product was transferred to a distilling pot and the carbon tetrachloride solvent was boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 1 mm. mercury pressure and at a vapor temperature up to 230° C. The telomer yield was 78% with 93% of the product distilled. The telomer products prepared by the above-described process have an even number of carbon atoms in the chain and halogen terminal groups. Since sulfuryl chloride is usually employed as the telogen, the halogen terminal groups will usually be chlorine. Other telogens which may be employed are sulfuryl fluoride, sulfuryl bromide and fluorosulfuryl chloride.

Table I below describes the physical properties of the trifluorochloroethylene telomeric fractions which are preferred as one component of the presently described compositions. The particular fractions referred to in the table are normally liquid oils, greases and waxes which were prepared by the telomerization process above described. The telomer product is usually distilled into the fractions such as are listed in the Table I. However, narrower (e.g. trimer, tetramer, pentamer, etc., and any mixture thereof) or broader cuts can be made if desired. The molecular weights are approximate or average for each fraction. Actually the molecular weight of the telomers of trifluorochloroethylene ranges between about 300 and 2300. Fractions 2 and 3 of Table I are normally liquid oils, having between about 4 and 20 carbon atoms, and are the particularly preferred telomer products used as one component of the presently described novel compositions, especially in the compositions which are to be used as extreme pressure lubricants and particularly as anti-seize lubricants between ferrous surfaces where good load-carrying properties are necessary.

*Table I*

PHYSCIAL PROPERTIES OF TRIFLUOROCHLOROETHYL-ENE-SULFURYL CHLORIDE TELOMER PRODUCTS: $Cl(CF_2CFCl)_nCl$

| Fractions | 1 | 2 | 3 | 4 |
|---|---|---|---|---|
| Molecular Weight | 500 | 630 | 780 | 940 |
| Boiling Range, °C., at 1 mm. Hg | up to 95 | 95–132 | 132–208 | 208–245 |
| Viscosity, Centistokes: | | | | |
| 100° F | 3 | 25 | 220 | |
| 210° F | | 3.08 | 10 | 40 |
| Viscosity, Centipoises: | | | | |
| 100° F | 5.6 | 47 | 425 | |
| 210° F | | 5 | 18 | 75 |
| Pour Point, °F | <−70 | −45 | +30 | +90 |
| Specific Gravity: | | | | |
| 68° F./39° F | 1.86 | 1.93 | 1.96 | |
| 160° F./39° F | | 1.85 | 1.88 | 1.92 |
| Refractive Index, $n_D$: | | | | |
| 77° F | 1.401 | 1.405 | 1.410 | |
| 160° F | | | | 1.398 |

Other low molecular weight polymers of trifluorochloroethylene which may be employed are those obtained by the thermal cracking of high molecular weight polytrifluorochloroethylene thermoplastic and by a controlled polymerization of trifluorochloroethylene. The processes which may be employed to obtain such low molecular weight polymers of trifluorochloroethylene are those described in U.S. Patent 2,636,908, issued April 28, 1953, to A. L. Dittman and J. M. Wrightson, and in U.S. Patent 2,636,907, issued April 28, 1953, to W. T. Miller. It should be noted, however, that there are significant differences between the polymeric trifluorochloroethylene products produced by these processes and those produced by telomerization. For example, polymers produced by the thermal cracking process or by controlled polymerization to produce low molecular weight material have a random number of carbon atoms and no single identifiable species. The end group in the cracked polymers are unknown but are believed to be fluorine. Cracked polymer also has a higher fluorine content and a lower chlorine content than telomer. The fact that these are significant differences which affect the properties of the polymer is evidenced by the fact that the low molecular weight polymers of trifluorochloroethylene produced by telomerization of trifluorochloroethylene with sulfuryl chloride have better characteristics as ingredients in the lubricating compositions of the present invention and improve the load-carrying properties of the hydrocarbon mineral oils to a greater extent than do the polymers of trifluorochloroethylene produced by other techniques. The use of these telomers is therefore particularly preferred.

As indicated previously a lubricating oil of natural origin is employed as a second component of the novel compositions of the present invention. This second component is preferably a hydrocarbon lubricating oil derived from petroleum and its products and includes the standard mineral lubricating oils or distillates. The hydrocarbon lubricating petroleum oils or mineral oils are derived from paraffinic, naphthenic, asphaltic or mixed base petroleum crudes. If desired, various blended oils, as well as residuals from which asphaltic constituents have been carefully removed may be used. The oils may be refined by conventional methods using acid, alkali and/or clay or other agents, or they may be extracted oils produced by solvent extraction with solvents such as phenol, furfural, sulfur dioxide and the like to obtain spindle, neutral, brightstock, or cylinder stock grades of oil. Such refining procedures and terminology are well-known to those skilled in the art.

The hydrocarbon or mineral oils which may be employed range from thin to very viscous oils and include those having a viscosity between about 870 centistokes at 0° F. and about 25 centistokes at 210° F., or between about 4000 and about 120 Saybolt Universal seconds (S.U.S.) at 0° F. and 210° F., respectively, which viscosity values correspond to SAE numbers between 5W and 90. The selection of a particular mineral oil which is employed in the compositions of the present invention will depend to a large extent upon the particular end use of the resultant lubricating composition. For example, when the lubricating compositions of the present invention are to be used for low temperature operations, such as in the lubrication of moving parts of a refrigeration system, the naphthenic base mineral oils are preferably employed. For use at higher temperatures such as in hypoid gear lubrication, the paraffinic base oils are preferred.

Typical specific examples of the various lubricating oils which are used in accordance with this invention are Mid-Continent solvent extracted petroleum oil having a viscosity of 300 S.U.S. at 100° F.; ordinary grades of paraffinic Pennsylvania oils; the paraffinic base oil sold as Kendall gear-oil (SAE 80–90); and refrigeration compressor oils of relatively low pour point such as the naphthenic base refrigerator compressor oil sold commercially as Suniso G–4 oil having a viscosity at 100° F. of about 300 S.U.S. and Number 11004 Oil, Standard Oil Company of Indiana, having a viscosity at 100° F. of about 150 S.U.S.

The physical nature of the compositions of the present invention varies from relatively thin or light liquids of low viscosity to more viscous and heavier liquids and grease compositions. The concentration of the low molecular weight perfluorochlorocarbon component as compared to the concentration of the mineral oil component may vary over relatively wide limits. Generally speaking, the particular concentration of components which is employed will depend upon the nature and properties of each component and on the desired characteristics of the resultant lubricating composition. The compositions of this invention are made by admixing the telomer of trifluorochloroethylene, for example, and the mineral oil together under conditions which insure thorough commingling of each component. It is remarkable that the addition of as little as 1 weight percent of the sulfuryl chloride telomers of trifluorochloroethylene to the hydrocarbon lubricating oil used in accordance with the present invention improves the load-carrying properties of the oil so appreciably. In general, the weight ratio of the low molecular weight perhalogenated poylmer to mineral oil is between about 0.005:1 and about 0.4:1. The use of more than about 35 weight percent of the perfluorochloro polymeric component does not appreciably improve the load-carrying properties of the resulting compositions although higher concentrations improve the chemical resistance, and thermal stability of the lubricating composition. The preferred weight ratio of the low molecular weight perfluorochloro polymer to mineral oil is between about 0.01:1 and about 0.2:1, particularly when the telomers of trifluorochloroethylene having a viscosity at 210° F. of between about 3 and about 40 centistokes are admixed with the mineral oils having a viscosity at 210° F. of about 14 to 25 centistokes or an S.A.E. number of 90. These latter compositions have particularly good lubricity properties as evidenced by their Point B values and are particularly good lubricants for steel sliding on steel.

It is within the scope of the present invention to add as a third component a thickening or gelling agent in order to obtain grease compositions which find particular usefulness as extreme pressure lubricants between rubbing ferrous surfaces. The thickeners which may be employed comprise metal salts of organic acids and are preferably the metal salts of organic perfluorochlorocarboxylic acids, siliceous materials such as the bentonites and estersils, and aryl substituted ureas.

The perfluorochlorocarboxylic acids which are used to produce the salts which may be used as gelling agents in accordance with this invention are prepared from fluorochlorocarbon oils which are generally similar to those described above. They may be prepared, for example, by the potassium permanganate oxidation of a thermally cracked trifluorochloroethylene polymer. Such acids also may be prepared by hydrolysis with fuming sulfuric acid of the above-mentioned sulfuryl halide telomers of trifluorochloroethylene. The mixed telomer or any fraction thereof is treated with fuming sulfuric acid containing from 0 to 20 percent sulfur trioxide at a temperature between about 140° C. and about 210° C. for a period of time ranging between about 5 and about 25 hours to produce monocarboxylic acids having the formula $Cl(CF_2CFCl)_{n-1}CF_2COOH$ where $n$ is as above-defined. Salts are prepared from these acids by replacement of the hydrogen ions of the acids by the desired metal ions. The sodium, calcium, aluminum and cadmium salts of these organic perfluorochlorocarboxylic acids represent a preferred class of gelling agents which may be used in the preparation of the grease compositions of the present infention. Typical examples of this class of gelling agent are the calcium and aluminum salts of 3,5,7,8-tetrachloroundecafluorooctanoic acid and the sodium and calcium salts of 3,5,7,9,10-pentachloroperfluorodecanoic acid.

The soliceous materials which also may be used in preparing the novel grease compositions of this invention are the various oxides of silicon and derivatives thereof. The oxides of silicon are available commercially under the designation Silene (calcium silicate), Hi-Sil (hydrated silica), Calcene (calcium silicate), and Syloid (essentially pure silica). These are finely divided siliceous compounds. Other derivaties of silica which are employed are hydrous alumina silicate, hydrous magnesium silicate, and various naturally occurring siliceous clays such as attapulgite, and bentonite. Particularly suitable siliceous materials are the quaternary ammonium derivatives of the silicates or bentonites. Examples of such quaternary ammonium bentonites are decyl ammonium bentonite, dimethyl dioctadecyl ammonium bentonite which is commercially available as Bentone 34 and dioctadecyl ammonium bentonite. Bentone 34 is the preferred quaternary ammonium bentonite.

Another preferred type of siliceous material which may be employed as a gelling agent in accordance with the present invention are the estersils which are prepared by reacting an alcohol with silica. The alcohols with which the silica is esterified are the aliphatic alcohols having between 2 and 18 carbon atoms and preferably between 3 and 12 carbon atoms and are, for example, ethyl, n-propyl, n-butyl, n-hexyl, n-dodecyl and isobutyl alcohols as well as cyclopentanol, and cyclohexanol. The quantity of the aliphatic radicals (i.e. the organophilic surface) on the surface of the estersil should be sufficient to provide a layer, usually mono-molecular, on at least 25 percent of the surface of the silica and preferably on at least 50 percent of the surface.

The preparation of the grease compositions of the present invention is effected by admixing width, and intimately dispersing within the selected telomer fraction and mineral oil a minor proportion of the gelling agent. The exact quantity of the gelling agent that is admixed with the telomer oil-mineral oil blends of the present invention will depend upon the desired characteristics of the grease. Generally, however, the concentration of the gelling agent will be between about 1 and about 25 weight percent based on the combined total weight of the low molecular weight polymer of the perfluorochloroolefin and mineral oil, the preferred concentration ranging between about 2 and about 15 weight percent. The consistency of the grease is also controlled by the proper selection of a particular telomer fraction and mineral oil. Low molecular weight telomers are available as light to heavy oils, light to heavy greases and soft to hard waxes. By selection of a particular fraction of telomer and mineral oil or by blending various fractions, and by using a particular concentration of gelling agent, greases varying from light to relatively mobile gels to hard greases are obtained. Generally less of the thickener is used with the higher molecular weight telomers (i.e. greases and waxes) and more viscous mineral oils than with the lower molecular weight telomers (i.e. oils) and lighter mineral oils. The selection of the particular components is determined by the particular end use of the resulting lubricating composition. Thus where heavy duty lubricants are required, higher concentrations of thickener and higher viscosity telomers and hydrocarbon oils are used.

Various additives may be incorporated within the low molecular weight perfluorochloro polymer: mineral oil admixtures of the present invention in addition to the gelling agent to improve various characteristics of the end product. For example, surface active agents may also be added to improve, for example, the adhesive characteristics of the grease compositions. These surface active agents are organic amines which are prepared by reacting ammonia or a low molecular weight amine with epichlorohydrin or with neutral esters of a metaphosphoric acid. These surface active agents are commercially available under the trade name "Vitamine." The surface active agents when used are employed in concentrations not exceeding about 5 weight percent of the total weight of the composition. Other materials which may be added to the compositions of the present invention are molybdenum disulfide, graphite, metal sulfonates, etc.

The following examples are offered as a better understanding of the present invention and are not to be construed as unnecessarily limiting thereto. The Point B values given in the following examples were determined in a Shell four-ball extreme pressure lubricant tester.

The Shell four-ball tester consists essentially of three contacting balls (usually steel) held in a fixed position relative to each other and a fourth ball above and in contact with the other three. The fourth ball is pressed against three stationary balls with an adjustable force and rotated at constant speed. The points of contact are lubricated by oil in a cup surrounding the four-ball assembly. During a test, circular scars are worn in the surface of the three stationary balls. The diameter of the scars, which is a measure of wear, depends on the load, speed, time of test, and character of the lubricant. The Point B value given in the following examples indicates the load-carrying capacity of the lubricating compositions and represents that point at which metal-to-metal contact is observed, or is the maximum load without seizure between the lubricated metal surfaces.

EXAMPLE 2

This example illustrates the preparation of a normally liquid lubricating composition having improved lubricity properties.

The sulfuryl chloride-trifluorochloroethylene telomer employed in this example was that designated as fraction 3 of the above Table I (boiling point 132°–208° C. at 1 mm. Hg pressure, viscosity at 210° F. of 10 centistokes). The lubricating oil of natural origin which was employed was the paraffinic base petroleum oil known as Kendall gear-oil base and having an SAE designation of 80–90, a viscosity at 100° F. of 143.62 centistokes and a viscosity at 210° F. of 14.54 centistokes.

An intimate admixture containing 1 gram of the telomer was prepared by blending the telomer into 99 grams of Kendall gear-oil base at room temperature. The resulting liquid composition was then tested in the Shell four-ball tester and was found to have a Point B value (one-minute application of the machine) of 70 kilograms. This liquid lubricating composition is particularly useful as a gear lubricant.

The lubricity properties of this admixture are surprising and are considerably better than either the telomer or the paraffinic base petroleum oil. For example, the Point B value of the telomer fraction and the paraffinic base oil are 30 and 33 kilograms, respectively. It is remarkable and unexpected that the addition of only 1 weight percent of the telomer to the mineral oil increased the Point B value of the mineral oil by more than 100 percent.

EXAMPLE 3

This example further illustrates the preparation of a normally liquid lubricating composition having improved lubricity properties.

The sulfuryl chloride-trifluorochloroethylene telomer employed in this example was that designated as fraction 2 of the above Table I (boiling point 95°–132° C. at 1 mm. mercury, viscosity at 210° F. of 3.08 centistokes). The lubricating oil of natural origin which was employed was the naphthenic base petroleum oil commercially available as Suniso G-4 and having a viscosity at 100° F. of 61.99 centistokes and a viscosity at 210° F. of 6.38 centistokes, a viscosity index (ASTM method D 567) of 32, and a Point B value of 35 kilograms.

(A) An intimate and homogeneous admixture containing 1 percent by weight of the telomer was prepared by blending 1 gram of the telomer into 99 grams of the refrigerator compressor oil at room temperature employing mechanical agitation to obtain the homogeneous blend. The resulting liquid composition was then tested in a Shell four-ball tester and was found to have a Point B value (one-minute application of the machine) of 50 kilograms. This liquid composition is particularly useful as a refrigerator compressor oil.

The lubricity properties of this admixture also are surprising and are considerably better than either the telomer or the naphthenic base oil alone.

(B) An admixture containing 5 grams of the telomer of trifluorochloroethylene designated as fraction 3 of the above Table I and 95 grams of the naphthenic base oil, Suniso G-4, was found to have a viscosity index of about 30, a viscosity at 100° F. of 50.09 and a viscosity at 210° F. of 6.17.

EXAMPLE 4

This example illustrates the preparation of an improved grease composition comprising sulfuryl chloride-trifluorochloroethylene telomer oil and a mineral oil.

A grease composition is prepared by intimately admixing 20 grams of the sulfuryl chloride telomer of trifluorochloroethylene designated as fraction 3 of the above Table I and prepared as described in Example 1 above, 70 grams of the paraffinic base Kendall gear oil having an S.A.E. designation of 80–90, and 10 grams of the butylated estersil commercially available as Estersil GT, the preparation of which has been described earlier. Blending of these ingredients is achieved with mechanical agitation at about 50° C. The resultant grease composition has a Point B value (one minute application of the Shell four-ball tester) of about 60 kilograms.

As is apparent the present invention relates to novel compositions which comprise an admixture of a low molecular weight polymer of a perfluorochloroolefin and a hydrocarbon lubricating oil of natural origin. The preferred components are the low molecular weight sulfuryl chloride telomers of trifluorochloroethylene having a plurality of trifluorochloroethylene monomer units and chlorine terminal groups and the paraffinic and naphthenic base mineral oils. The novel compositions of the present invention including the normally liquid and grease compositions have particularly improved load-carrying properties than either of the individual components alone especially when the sulfuryl chloride-trifluorochloroethylene telomers are used. Other alterations and modifications of the compositions of the present invention and of the method of preparing such compositions may become apparent to those skilled in the art without departing from the scope of the present invention.

I claim:

1. A novel lubricating composition having improved load-carrying properties which consists essentially of an admixture of a distillable open chain telomer of trifluorochloroethylene containing a plurality of trifluorochloroethylene monomer units and chlorine terminal groups having a molecular weight between about 300 and about 2300, and a mineral oil having a viscosity between about 870 centistokes at 0° F. and about 25 centistokes at 210° F., the weight ratio of telomer to mineral oil being between about 0.01:1 and about 0.2:1.

2. A novel lubricating composition having improved load-carrying properties which consists essentially of an admixture of a distillable open chain telomer of trifluorochloroethylene containing a plurality of trifluorochloroethylene monomer units and chlorine terminal groups having a molecular weight between about 500 and about 940 and a viscosity at 210° F. of between about 3 and about 40 centistokes, and a mineral oil having a viscosity at 210° F. of between about 6 and about 25 centistokes, the weight ratio of telomer to mineral oil being between about 0.01:1 and about 0.2:1.

3. A novel lubricating composition having improved load-carrying properties which consists essentially of an admixture of a distillable open chain telomer of trifluorochloroethylene containing a plurality of trifluorochloroethylene monomer units and chlorine terminal groups having a molecular weight between about 500 and about 940 and a viscosity at 210° F. of between about 3 and about 40 centistokes, and a paraffinic base mineral oil having a viscosity at 210° F. of about 14 centistokes, the weight ratio of telomer to mineral oil being between about 0.01:1 and about 0.2:1.

4. A novel lubricating composition having improved load-carrying properties which consists essentially of an admixture of a distillable open chain telomer of trifluorochloroethylene containing a plurality of trifluorochloroethylene monomer units and chlorine terminal groups having a molecular weight between about 500 and about 940 and a viscosity at 210° F. of between about 3 and about 40 centistokes, and a naphthenic base oil having a viscosity at 210° F. of about 6 centistokes, the weight ratio of telomer to mineral oil being between about 0.01:1 and about 0.2:1.

References Cited in the file of this patent

UNITED STATES PATENTS

| | | |
|---|---|---|
| 2,554,222 | Stross | May 22, 1951 |
| 2,558,079 | Gallsworthy | June 26, 1951 |
| 2,612,529 | Feasley | Sept. 30, 1952 |
| 2,623,852 | Peterson | Dec. 30, 1952 |
| 2,636,907 | Miller | Apr. 28, 1953 |
| 2,676,148 | Iler | Apr. 20, 1954 |
| 2,679,479 | Peterson | May 25, 1954 |
| 2,681,940 | Ruh | June 22, 1954 |
| 2,695,880 | Benning et al. | Nov. 30, 1954 |
| 2,704,363 | Armstrong | Mar. 15, 1955 |
| 2,705,700 | Iler | Apr. 5, 1955 |
| 2,706,715 | Conner | Apr. 19, 1955 |
| 2,746,922 | Braendle | May 22, 1956 |
| 2,770,659 | Barnhart | Nov. 13, 1956 |

OTHER REFERENCES

Miller et al.: Ind. and Chem. Eng., March 1947, vol. 39, No. 3, pp. 333–36.